United States Patent [19]

Brough et al.

[11] Patent Number: 4,638,440
[45] Date of Patent: Jan. 20, 1987

[54] FEEDING AND DATA ENTRY SYSTEM FOR LUMBER TRIMMER

[75] Inventors: William R. Brough, Federal Way; James C. Borgen, Aberdeen, both of Wash.

[73] Assignee: Weyerhaeuser Company, Tacoma, Wash.

[21] Appl. No.: 656,415

[22] Filed: Oct. 1, 1984

Related U.S. Application Data

[63] Continuation of Ser. No. 218,852, Dec. 22, 1980, abandoned.

[51] Int. Cl.$^4$ .................. G06F 15/46; G05B 19/19
[52] U.S. Cl. .................... 364/475; 144/367; 198/362; 209/521; 364/189
[58] Field of Search ............. 144/357, 242 R, 245 A, 144/367, 245 R, 312; 83/71, 69, 371; 364/188, 189, 464, 475, 478; 209/942, 517, 521; 198/348, 362

[56] References Cited

U.S. PATENT DOCUMENTS

| | | | |
|---|---|---|---|
| 3,759,384 | 9/1973 | Holmberg et al. | 209/942 |
| 3,931,501 | 1/1976 | Barr et al. | 364/475 |
| 4,069,851 | 1/1978 | Bibler | 209/517 |
| 4,086,496 | 4/1978 | Berry | 144/312 |
| 4,158,766 | 6/1979 | Sjödin | 235/92 V |
| 4,181,947 | 1/1980 | Krauss et al. | 364/478 |
| 4,195,346 | 3/1980 | Schröder | 364/478 |
| 4,305,128 | 12/1981 | Manabe et al. | 364/475 |

Primary Examiner—Felix D. Gruber

[57] ABSTRACT

In a feeding and data entry system for a lumber trimmer, the data entry zone is located upstream and substantially adjacent a lug loader. An operator reads the grader's marks when each incoming board is stopped and inputs the data into a programmable logic controller having a first-in, first-out memory unit. Once the data is input, the respective board is loaded into the next set of lugs on the lug chain and travels through the trimmer. The controller causes the correct saws to move into the path of the board to make the proper cuts. The controller then directs the trimmed board to its proper sort location.

10 Claims, 1 Drawing Figure

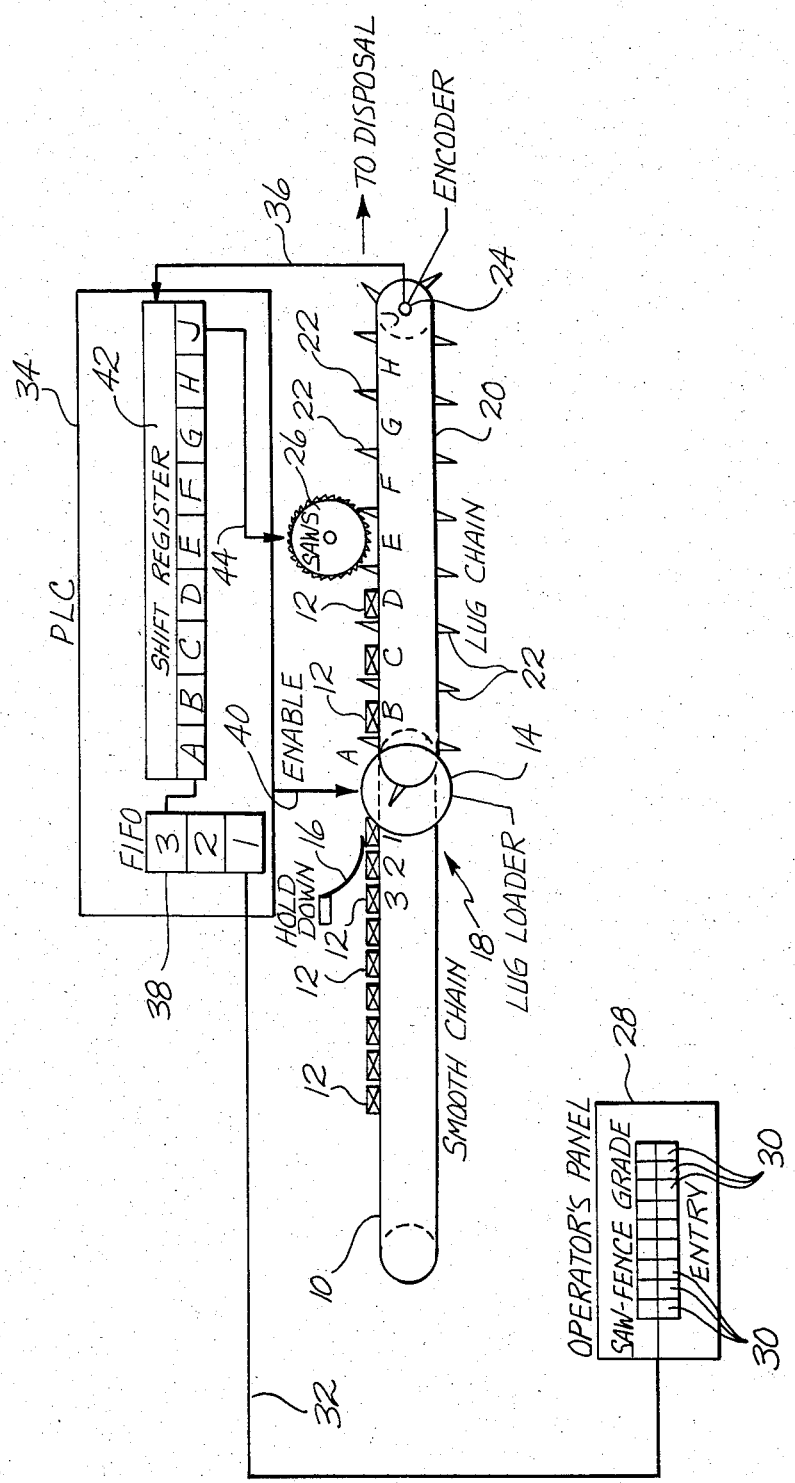

FEEDING AND DATA ENTRY SYSTEM FOR LUMBER TRIMMER

This application is a continuation of application Ser. No. 218,852 filed Dec. 22, 1980 and now abandoned.

BACKGROUND OF THE INVENTION

This invention relates generally to trimmers for lumber and more particularly to an improved feeding and data entry system for a trimmer.

In most lumber mills, one of the last steps in the manufacturing process is grading, trimming and sorting. Typically, when grading and trimming dry lumber, stacks of lumber coming from dry kilns will be disassembled and the pieces transversely conveyed to the grading station. Usually several graders will visually observe each piece of lumber on one or both sides and mark the piece with a trim indication and a grade indication. The marks are most typically made with chalk on the ends passing by the graders which can then be read by the trimmer operator.

The marked boards are then conveyed to a lug loader. The lug loader acts as a stop for the boards that are randomly entering the system. Then the loader will cycle, causing one board at a time to be placed onto a chain that has lugs affixed at a specific spacing. As the board moves with the fixed lug chain, it will pass through a specific area known as the data entry zone. As the board moves through the data entry zone, the trimmer operator must read the grader's chalk marks and input this information into the trimmer and sorting control system. The fixed lug chain is a continuously moving chain and, therefore, the operator has only a limited (based on drive speed of the lug chain) time to make the entry. If the entry is completed while the board is in the data zone, then when the board reaches the trimmer the appropriate saws will cut the board to length. After being cut to length, the board will be sorted (placed with other boards of similar length and quality).

With most automatic trimming and sorting systems, the data entry zone is at a location downstream of the lug loader and, of course, upstream from the trimmer. The lug chain is set at a speed determined by the supposed capability of the trimmer operator to view and then input the data for each board. Both the trim data and grade must be correctly determined and then correctly input, all while the boards travel through the data entry zone at a high rate. The lug loader continuously feeds boards to open lugs on the lug chain and the operator must keep up with the flow past the fixed data entry zone. Inherent in this state-of-the-art feeding and data entry system is pressure on the trimmer operator. With boards moving past at up to one per second, oftentimes a late entry is made with the consequence being that two boards can be mistrimmed and missorted; once a board moves out of the entry zone and data entered, supposedly for it, it will be trimmed and sorted according to the previous set while the next board within the zone will have improper data entered for it. Then the operator must "catch up" and oftentimes makes erroneous entries under the pressure just to catch up.

In present systems, the trimmer operators try to compensate for the inherent problem by looking at boards upstream from those in the data entry zone in order to memorize the grade and trim marks and then attempt to stay ahead by entering correct data when the particular board is in the data entry zone based on the operator's sense of timing. Once the speed of the lug chain is set, for example at sixty lugs per minute, then the lug loader will kick boards from the upstream chain into each set of lugs sequentially on a continuous basis. If the operator fails to make an entry, than at least one board is erroneously handled and if the operator, as previously mentioned, is in a "catch up" mode, the errors can be compounded.

In the past, if an operator came under such pressure that significant cumulation errors were being made, the only alternative was to slow down the lug chain. This alternative is not a desirable one since overall mill production is then lowered. Usually the trimmer operator would be replaced. In short, the trimmer operator has an extremely stressful job, one that is improved significantly by the present invention.

Accordingly, from the foregoing, one object of the invention is to offer a trimmer operator more flexibility in data entry.

Another object is to reduce the number of mistrimmed and missorted boards coming from the trimmer.

Yet a further object is to reduce the mental pressure and fatigue on the operator.

Still a further object is to provide a surge monitoring capacity through a memory means.

These and many additional objects will become more apparent upon reading the detailed description in combination with the drawing.

SUMMARY OF THE INVENTION

Briefly stated, the present invention is practiced in one form by a trimmer feeding and data entry system having a lug loader feeding individual boards to a lug chain. Boards will not be transferred until after the trim and grade data has been entered into a programmable logic controller or other suitable control means. The control means has a first-in, first-out memory means whereby the data for a number of boards can be stored and then output at the appropriate time to activate selected trim saws and sorting bin means.

DESCRIPTION OF THE DRAWINGS

The FIGURE shows a schematic block diagram depicting the improved trimmer feeding, data entry and control system.

DETAILED DESCRIPTION OF THE PREFERRED EMBODIMENT

Referring to the FIGURE, the feeding and transport system is substantially state-of-the-art equipment and will be well understood by those skilled in the art. Briefly, a smooth chain 10 will bring individual boards, each indicated at 12, from the grading station (not shown) with the near end of each board having the trim and grade marks on the top surface. The boards come at a rate whereby they tend to back up when stopped at the lug loader 14. A suitable hold down member 16 serves to maintain each board in its proper orientation at the lug loader. When each board 12 is just upstream from lug loader 14, it is stopped and held until the trim and grade data is entered into the control system. The data entry zone 18 is, therefore, upstream from the lug chain 20 and the boards are examined and data entered while they are at rest rather than traveling. The operator's location will be substantially adjacent entry zone 18 or at least clearly visible from the location. By being adjacent zone 18, not only can the boards be observed, but if boards 12 become stuck or otherwise a problem, the operator can quickly correct the error.

Lug chain 20 is also typical in that a plurality of laterally spaced individual lugs 22 are mounted on the chain and are uniformly spaced apart in the longitudinal direction or the direction of travel of the boards. An encoder 24 is a part of lug chain 20 and may be of any suitable type, such as a shaft encoder, for tracking each lug position. Between the infeed and outfeed ends of lug chain 20 are the trim saws, one of which is depicted graphically at 26. Saws 26 are also state of the art and are mounted in a suitable frame means so each can be lowered into the path of the traveling boards upon being activated. The boards 12 are even ended so the saws are all located with respect to a predetermined lateral distance from one end of each board, thereby providing for accurately located trim cuts.

The lug loader 14, as is well known, is a mechanical device that moves one board 12 at a time from smooth chain 10 to lug chain 20. The cycle of lug loader 14 is controlled by a cam and follower (not shown) that time the feed of boards 12 between lugs 22 of lug chain 20. Cycling of the loader 14 can be interrupted by activating a solenoid (not shown) that removes the cam follower.

The trimmer operator has before him for inputting data into the saw control and sorting system an operators' panel 28 having a plurality of touch keys 30 to generate signals indicative of his decisions with respect to which saws to activate and where the particular board will be deposited according to its grade. As each board 12 is stopped ahead of lug loader 14 at data entry zone 18 awaiting feed onto lug chain 20, the operator observes the board and inputs data via keys 30. As the data is entered, signals flow via line 32 to a programmable logic controller 34 or other suitable data processing and control device, such as the "Modicon 384 Programmable Logic Controller." Also flowing into controller 34 are signals via line 36 from encoder 24. As the grade and trim data is entered, it is first stored in position one of a typical first-in, first-out memory unit 38, with the next data for the next board in line going into position two and the next data for the third board waiting at lug loader 14 within entry zone 18 going into position three. Additional positions could be provided in memory unit 38 if desired. If data exists in position one, then the lug loaders cam and follower are engaged enabling the first board in line at loader 14 to be loaded into the next set of lugs 22. Lug chain 20 is set to travel at a constant relatively high rate of speed. If data is in position two of the memory unit, the second board (although since the preceding board has left, it will in fact be first in line) will then be immediately kicked into the next incoming set of lugs 22 and the same with position three for the next board. Each loader enabling signal is sent to lug loader 14 via line 40.

Within controller 34 is a typical shift register unit 42 which accepts data from memory unit 38 and is transferred from one position (A through J corresponding to the lugs along the top run of lug chain 20) to the next by the signals received from encoder 24 via line 36. The output signals from shift register 42 sent over line 44 serve to activate the saws and the sorting system (not shown).

It is important to note that while the lug chain 20 travels at a continuous high speed, the data is entered into the control system at a rate determined by the operator and not solely by the machine. The present invention provides more flexibility to the operator in his decision making and data entry, thereby reducing mistakes and actually increasing production through the trim and sorting system.

It will thus be appreciated that a significantly improved feeding and data entry system for a lumber trimmer has been disclosed that is a great advance over the state of the art. It is intended that all obvious modifications to the preferred embodiment, as well as the preferred embodiment, be included within the scope of the appended claims.

What is claimed:

1. A feeding and data entry system for a lumber trimmer, comprising:
    a first conveyor means for bringing marked boards to a data entry zone where each board makes at least one step within the zone,
    a second conveyor means for accepting boards from the first conveyor means,
    a data processing and control means for receiving and sending data,
    a loader means for transferring each board to the second conveyor means only after data is entered into the data processing and control means indicative of at least the decision of the location of trimming cuts, and
    means for tracking each board as it moves on the second conveyor means into the trimmer and for activating the selected saws to make the trim cuts.

2. The system of claim 1 including a first-in, first-out memory means within the data processing and control means for storing a predetermined number of sequentially made decisions on boards at the data entry zone.

3. The system of claim 1 including means for an operator to electronically enter decision data into the data processing and control means including a panel having touch keys indicative of at least trim locations.

4. The system of claim 1 further including means to move the second conveyor means at a constant speed.

5. The system of claim 2 in which the second conveyor means is a lug chain having a plurality of lug sets uniformly spaced apart.

6. The system of claim 2 in which the loader means is a lug loader.

7. The system of claim 2 in which the tracking means includes an encoder for generating signals to track each board after its data is input to a location at least through the trimmer.

8. The system of claim 1 further including means within the tracking means for causing each board after it passes through the trimmer to be directed to a predetermined location.

9. The system of claim 1 in which the data processing and control means includes a programmable logic controller.

10. The system of claim 3 including keys on the panel indicative of sort location downstream from the trimmer.

* * * * *